US007287802B2

(12) United States Patent
Dankert et al.

(10) Patent No.: US 7,287,802 B2
(45) Date of Patent: Oct. 30, 2007

(54) VEHICLE TRANSOM WINDOW ASSEMBLY

(75) Inventors: Daryl F. Dankert, Mishawaka, IN (US); Robert Carl Eckstein, Osceola, IN (US); Darren M. Grumm, Cassopolis, MI (US); Todd E. Cripe, Goshen, IN (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 108 days.

(21) Appl. No.: 10/946,631

(22) Filed: Sep. 21, 2004

(65) Prior Publication Data

US 2005/0110299 A1   May 26, 2005

Related U.S. Application Data

(60) Provisional application No. 60/505,191, filed on Sep. 23, 2003.

(51) Int. Cl.
*B60J 1/04* (2006.01)
(52) U.S. Cl. .................... 296/146.16; 296/201
(58) Field of Classification Search .......... 296/146.16, 296/146.1, 77.1, 201; 49/171, 163, 324; 52/204.51
See application file for complete search history.

(56) References Cited

U.S. PATENT DOCUMENTS

| 5,195,797 | A | * | 3/1993 | Hobbs | 296/77.1 |
|---|---|---|---|---|---|
| 5,385,379 | A | * | 1/1995 | Heavner | 296/84.1 |
| 5,551,197 | A |  | 9/1996 | Repp et al. | 52/204.62 |
| 6,164,715 | A |  | 12/2000 | Mosaner | 296/146.1 |
| 6,312,043 | B1 |  | 11/2001 | Blackburn et al. | 296/146.16 |
| 6,412,225 | B1 |  | 7/2002 | McManus | 49/381 |
| 2003/0107221 | A1 |  | 6/2003 | Kobrehel |  |
| 2003/0110703 | A1 |  | 6/2003 | Kobrehel |  |

FOREIGN PATENT DOCUMENTS

| CA | 1057796 | 7/1979 |
|---|---|---|
| CA | 2258314 | 7/1999 |

* cited by examiner

*Primary Examiner*—Joseph D. Pape
(74) *Attorney, Agent, or Firm*—Peter D. McDermott; Banner & Witcoff Ltd.; Dean B. Watson

(57) ABSTRACT

A transom window assembly is provided that comprises a windowpane and an openable transom pane, the windowpane and the transom pane being adjacent to each other. A transom hinge hingedly connecting the windowpane and the transom pane to each other comprises a first hinge portion attached to the interior surface of the transom pane along a lower edge, preferably directly attached, and a second hinge portion attached to the interior surface of the windowpane along the transom opening edge. The transom window is capable of being swung between a closed position and an open position. Certain embodiments of the window assemblies have a flush appearance. Also provided are vehicles comprising a vehicle window assembly in accordance with those just described.

37 Claims, 12 Drawing Sheets

VEHICLE TRANSOM WINDOW ASSEMBLY

This application claims the benefit of U.S. Provisional Application No. 60/505,191, entitled VEHICLE TRANSFORM WINDOW ASSEMBLY, which was filed on Sep. 23, 2003 on behalf of Dankert et al.

FIELD OF THE INVENTION

This invention relates generally to the field of openable transom window assemblies for vehicles.

BACKGROUND

Transom windows would provide advantages, especially in vehicles, especially, for example, in recreational vehicles and mass transit vehicles, for increased light, ventilation and cooling. Vehicles have traditionally not employed transom windows in view of the difficult engineering and styling issues presented in positioning a transom window above a primary window in a vehicle body. A transom window would have to be sufficiently robust to withstand the harsh use environments often experienced by vehicles, including vibration, thermal cycling and temperature extremes, etc. Also, a frame or attachment hardware for a transom window would be aesthetically disadvantageous on the exterior of the vehicle due to the undesirable effect of preventing a flush appearance for the vehicle.

It is an object of the present invention to provide vehicle window assemblies with transom panes. In view of the following disclosure of the invention and detailed description of certain embodiments or examples, additional objects and features of the inventive subject matter will be apparent to those skilled in the art, that is, those who are knowledgeable or experienced in this field of technology.

BRIEF SUMMARY

In accordance with a first aspect, vehicle window assemblies having a windowpane and an openable transom pane are provided. Each of the windowpane and the transom pane has an interior surface and an exterior surface. The transom pane has a lower edge, and the windowpane has a transom opening edge that is typically adjacent the lower edge of the transom pane. The transom pane and the windowpane are hingedly connecting to each other along said lower edge and transom opening edge, respectively, by a transom hinge comprising a first hinge portion attached to the transom pane and a second hinge portion attached to the windowpane. The first hinge portion in certain embodiments is attached to the transom pane such that no part of the first hinge portion extends outwardly beyond the plane defined by the exterior surface of the transom pane, and the second hinge portion is attached to the windowpane such that no part of the second hinge portion extends outwardly beyond the plane defined by the exterior surface of the windowpane. In this fashion, embodiments of the vehicle window assemblies disclosed here present the exterior surfaces of the transom pane and windowpane as the outermost elements, providing a smooth and streamlined appearance when viewed from outside of the vehicle. In certain embodiments, the exterior surface of the transom pane is uncovered and uninterrupted, i.e., free and not pierced. Thus, any optional frame member does not wrap around the edge(s) of the pane to cover any of the exterior surface, and fasteners for the hinge, the frame (if any) and any other components of the window assembly attached to the transom pane do not pierce or pass through the exterior surface. For example, the first hinge may be attached to the interior surface of the transom pane such that no part of the first hinge portion extends outwardly beyond the exterior surface of the transom pane. Optionally, the second hinge portion may be attached to the interior surface of the windowpane such that no part of the second hinge portion extends outwardly beyond the plane defined by the exterior surface of the windowpane. Advantageously, such embodiments can provide a flush, openable transom window. The transom panes in such window assemblies can be in a plane (or extend a plane) of the main window below it and/or of surrounding vehicle body panels, etc. to achieve an aesthetically desirable appearance along with low wind noise and other advantages.

In certain embodiments, the first hinge portion is directly attached to the transom pane, i.e., with surface-to-surface contact between the first hinge portion and the transom pane. The first hinge portion is a unitary piece forming not only the surface in contact with the interior surface of the transom pane but also the hinge axis joint, e.g., all or a portion of a hinge pin barrel or one or more hinge hooks adapted to hingedly engage correspondingly configured hinge hooks of the hinge portion that is attached to the windowpane. Thus, the first hinge portion in such embodiments is integral with the transom pane without intervening linking members. The surface-to-surface attachment may be by suitable glass adhesive, e.g., one- or two-component polyurethane, or by one or more through-glass bolts, other fasteners or the like. Preferably the attachment is by adhesive or fasteners that leave the exterior surface of the transom pane free and uninterrupted, i.e., uncovered and not pierced, for example, by fasteners that do not extend through the exterior surface of the transom pane. Those skilled in the art will understand that direct attachment by adhesive or otherwise does not exclude the presence on the interior surface of the transom pane or on the hinge of frit or other coating, adhesion promoters, primer and the like. For example, the interior surface of the transom pane may be coated, e.g. with frit, under the first hinge portion, that is, intermediate the first hinge portion and the interior surface of the transom pane. It should also be understood that the first hinge member can be unitary with all or part of an optional frame for the transom pane, e.g., an extruded aluminum frame extending along the lower periphery of the transom pane. Such optional unitary frame segment may extend along only the lower periphery of the transom pane or around more of the circumference of the pane, even around the entire circumference, and may wrap around the edge of the glass to the exterior surface of the transom pane or leave the exterior surface free, i.e., uncovered and uninterrupted. In certain embodiments, the windowpane may have the second hinge member, and any other associated hardware, e.g. a window frame, attached directly to the interior surface of the windowpane in a similar fashion, for example by adhesive or by fasteners. Likewise, the exterior surface of the windowpane may be free, i.e., uncovered and uninterrupted in similar fashion.

In certain embodiments, the transom pane and the windowpane of an openable vehicle window assembly are substantially flush to each other. That is, at least along their adjacent edges, the exterior surface of the transom pane is in substantially the same plane as the exterior surface of the windowpane of the associated main window. The term "substantially flush" means that the two exterior surfaces are in precisely the same plane or are so closely co-planar as to have the appearance of being co-planar to ordinary observers from the exterior of the vehicle under typical viewing conditions. In certain examples of the vehicle window assemblies disclose here, the exterior surfaces of the transom pane and windowpane are substantially flush and lie in the same flat plane. In certain examples of the vehicle window assemblies disclose here, the exterior surfaces of the transom pane and windowpane are substantially flush and curvoplanar. Thus, certain examples of the openable vehicle window assemblies disclosed here can provide a smooth appearance. In vehicles having both transom window assemblies and non-transom window assemblies together along a side of the vehicle, the openable vehicle window assemblies disclosed here can make the outward appearance of the vehicle more pleasingly uniform, the outward appearance of the transom window assembly(ies) more closely matching that of the window assembly(ies) not containing a transom window. In this fashion, window assemblies are provided that contain a transom pane capable of being swung between a closed position and an open position wherein the window assembly has a substantially flush appearance.

In certain embodiments, the vehicle window assemblies may contain a transom latch operative to latch the transom window in a closed position. The transom latch will typically comprise a first transom latch portion attached to the interior surface of the transom pane. The first transom latch portion in certain embodiments is attached directly to the interior surface of the transom pane, and is optionally attached by means of adhesive or fasteners. A second transom latch portion is operative in cooperation with the first latch portion to latch the transom pane in a closed position and may be attached to the windowpane, to a separate panel which is optionally a component of the window assembly, or to a window frame, backframe, or part of a vehicle wall in which the window assembly is mounted. The first transom latch portion in such an embodiment is attached to the transom pane such that no part of the first transom latch portion extends outwardly beyond the plane defined by the exterior surface of the transom pane. Where the second transom latch portion is attached to a part of the window assembly, it is attached such that no part of the second transom latch portion extends outwardly beyond the plane defined by the exterior surface of the windowpane.

In certain embodiments, the vehicle window assemblies further comprise a transom window stop attached to the transom pane, typically at a first end of the transom window stop, and attached to any suitable fixed portion at a second end. The transom window stop is in certain embodiments attached to the interior surface of the transom pane, optionally by means of adhesive or fasteners. In certain embodiments, the transom window stop is attached to the interior surface of the transom pane such that it does not extend outwardly beyond the plane defined by the exterior surface of the transom pane. The transom window stop is operative to prevent the transom pane from opening more than a predetermined amount, that is, beyond a predetermined fully open position. Optionally, the transom window stop will also operate to hold the transom pane at one or more intermediate positions between the first, closed position and the fully open position.

Window assemblies having transom windows as disclosed herein can be fixed or attached to a vehicle. In certain embodiments, the vehicle window assemblies are fixed to a vehicle wall in a non-moving fashion, that is, such that the windowpane does not move. Optionally, the windowpane itself can be made capable of movement whereby the windowpane can be opened. In still other embodiments, the window assembly itself can be attached to a vehicle wall such that the window assembly is openable, for example, where it is desired that the window assembly containing a transom window be capable of functioning as an egress window for emergency egress from the vehicle. In certain embodiments, the window assembly includes a backframe that is adapted to fit into an opening in the vehicle wall and to which the remainder of the window assembly can be attached, either fixedly or openably as just described. Of course, it will be readily apparent to those of skill in the art that in any of the embodiments just described, the transom pane itself is openable, regardless of the fixed nature of the window assembly.

In certain embodiments, in which the window assembly is of the egress type, the window assembly comprises an egress hinge. The egress hinge in certain embodiments includes a first egress hinge portion attached to the openable portion of the window assembly and a second egress hinge portion attached to a fixed portion of the window assembly or to some portion of the vehicle in which the window assembly is installed. A fixed portion of the window assembly is a portion of the window assembly that remains stationary when the egress window is opened. For example, the window assembly may contain a window frame to which the windowpane and optional panel(s) are attached; the first egress hinge portion may be attached to or unitary with such a window frame. Optionally the window assembly will also have an egress latch assembly, typically made up of a first egress latch portion attached to the openable portion of the window assembly and a second egress latch portion attached to a fixed portion of the window assembly or to some portion of the vehicle in which the window assembly is installed. Optionally, no portion of the egress hinge or the egress latch extends outwardly beyond the plane defined by the exterior surface of the windowpane, such that the flush appearance of the transom pane and windowpane remains. Such embodiments may advantageously be mounted in a vehicle wall such that the window assembly is itself flush, as further defined herein.

Certain embodiments of the present invention provide a transom window assembly advantageously employing one-sided bonding, such as, for example, adhesive bonding, such that the various transom components and, where appropriate, egress components are attached to the windowpane and transom pane, respectively, free of the outer surface of the windowpane and transom pane. The outer surfaces of both the windowpane and transom pane may be positioned such that each is generally flush with an exterior surface of an adjacent surface of the vehicle, for example, with an exterior surface of an adjacent body panel of the vehicle. The outer surfaces of both the windowpane and transom pane may in certain embodiments be positioned such that each is generally flush with a second windowpane of a second widow assembly, generally an adjacent window assembly, and may be positioned such that the peripheral edge of the window assembly pane is substantially abutting a peripheral edge of the adjacent window pane. The transom pane and windowpane is also capable of being mounted flush to the vehicle outer skin, which provides for both improved aerodynamics and aesthetics.

From the foregoing disclosure, it will be readily apparent to those skilled in the art, that the present invention provides a significant advance in vehicle appearance. Also, the openable transom windows disclosed here can provide ventilation, light and cooling for the interior of the vehicle. These and additional features and advantages of the vehicle window assemblies disclosed here will be further understood from the following detailed disclosure of preferred and exemplary embodiments.

Figure 1:
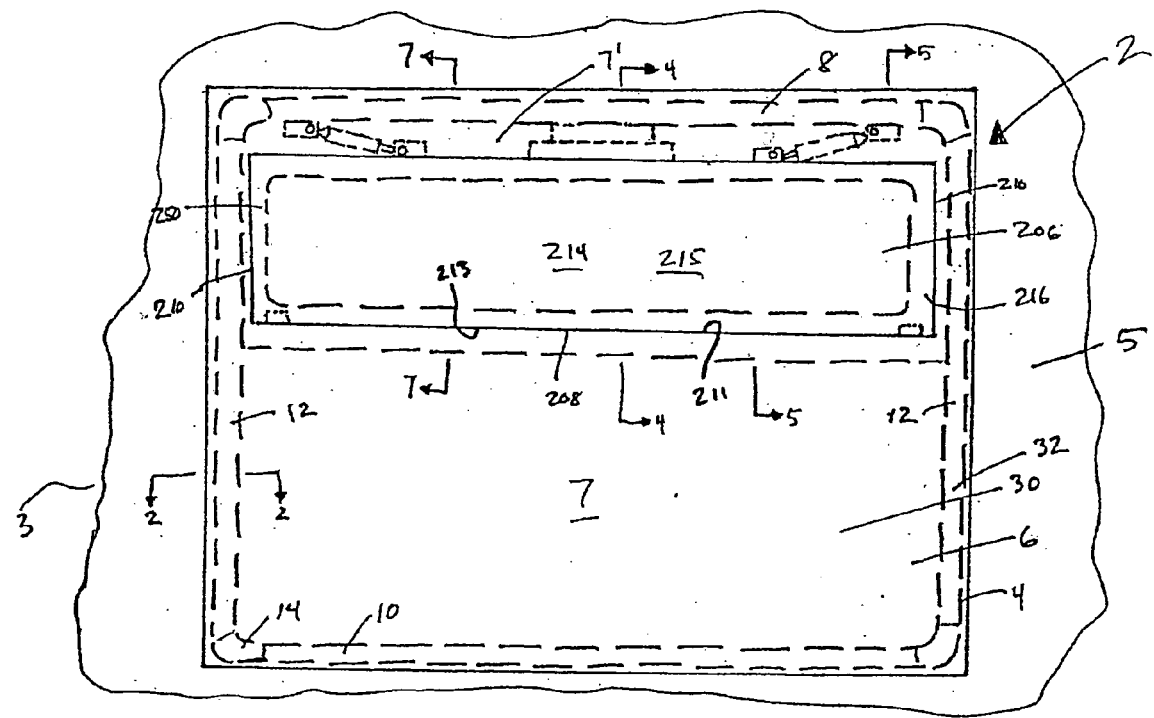
FIG. 1 is an elevation view of a preferred embodiment of a vehicle window assembly having an openable transom pane in accordance with the present invention.
Figure 2:
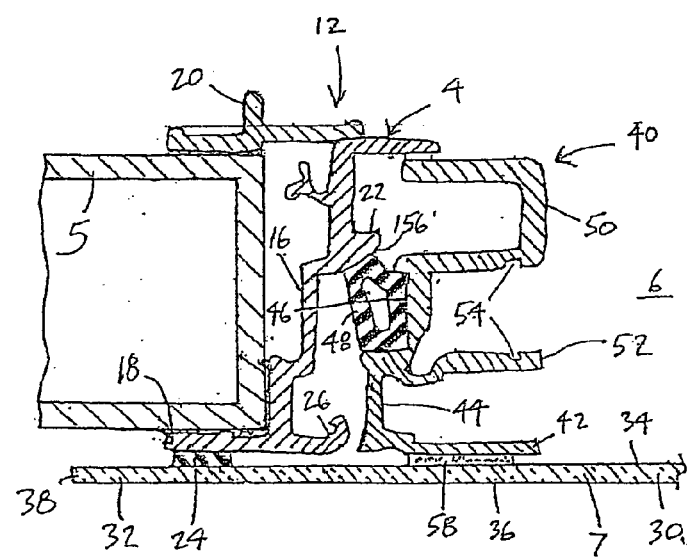
FIG. 2 is a section view, taken along line 2-2 of FIG. 1, of the vehicle window assembly of FIG. 1.

In certain instances the same reference number is used in the drawings and the discussion below for the same component employed in different embodiments. It should be understood that the appended drawings are not necessarily to scale, presenting a somewhat simplified representation of certain preferred embodiments illustrative of the basic principles of the invention. The specific design of window assemblies in accordance with the invention, including, for example, specific configuration and dimensions of the windowpane and transom pane will be determined in part by the intended application and use environment. Certain features of the assembly have been enlarged or distorted relative to others to facilitate visualization and clear understanding. In particular, thin features may be thickened, for example, for clarity of illustration. All references to direction and position, unless otherwise indicated, refer to the orientation of the vehicle window assemblies illustrated in the drawings. In general, directions to the right and left in the plane of the paper in FIG. 1 can be referred to as lateral directions, and the directions normal to the plane of the paper in FIG. 1 shall be referred to as inboard and outboard. The directions from the periphery of the windowpane toward the center of the windowpane shall be referred to as laterally inward. It should be understood that vehicle window assemblies in accordance with the invention can be used in diverse applications.

DETAILED DESCRIPTION OF THE INVENTION

The following discussion of certain preferred embodiments focuses on window assemblies used in vehicles, such as, for example, mass transit vehicles or recreational vehicles ("RV's"), however, the design and operating principles are applicable generally to window assemblies suitable for diverse applications. In the embodiments disclosed here, the window assembly has a generally rectangular shape, as is common in current production mass transit window designs. However, it will be readily apparent to those skilled in the art that window assemblies having alternate geometries may be employed within the scope of the invention.

The vehicle window assemblies disclosed here include a transom pane capable of being opened, e.g. for ventilation. In certain embodiments, the vehicle window assemblies find utility in recreational vehicles or in mass transit vehicles, in which a larger window assembly can include a smaller openable pane. In certain embodiments, the window assemblies have a flush appearance, that is, the outer surface of the windowpane and the transom pane, when in a closed position, are substantially co-planar as described above. The assemblies can be "flush" in embodiments wherein the window pane, the transom pane or both are curvo-planar, where, e.g., the adjacent peripheries of the window pane and transom pane transition smoothly from one to the other such that each are substantially a continuation of the curved plane of the other in their adjacent peripheries. Optionally the vehicle window assemblies themselves are flush mountable, that is, can be mounted into a vehicle such that the exterior surfaces of the windowpane, the transom pane, and the optional panels are flush with an exterior surface of the vehicle. The assemblies are optionally capable of being mounted such that at least one peripheral edge of the windowpane is in an abutting relationship to a peripheral edge of an adjacent windowpane. In certain embodiments, the mounting hardware of the transom pane, that is, the transom hinge, optional transom latch, optional transom window stop, and any other optional components that might be attached to the transom pane, is "hidden" so as to not extend outwardly beyond the plane defined by the exterior surface of the windowpane and/or transom pane. Such an embodiments are advantageous in that no part of the mounting hardware will be visible from the exterior of the vehicle, save for that portion that might be visible through the windowpane or transom pane, providing an aesthetically pleasing streamlined appearance to the window assembly. Optionally, the window frame and other components for mounting the window assembly into a vehicle likewise do not extend outwardly beyond the plane defined by the exterior surface of the windowpane, adding to the streamlined look of the vehicle window assembly.

In the embodiment illustrated in FIGS. 1, 2 and 4-7, vehicle window assemblies are seen to include a windowpane and a transom pane. Referring to FIG. 1, complete vehicle window assembly 2 can be assembled first and then mounted into window opening 6, or can alternatively be installed into window opening 6 in parts, i.e., an uncompleted assembly can be completed during installation. Transom pane 214 may be formed of glass, tempered glass, laminated glass, clear plastic and the like, and may optionally be tinted, painted, e.g., with frit, over some or all of its surface area. In other embodiments, transom pane 214 may be formed of an opaque material, such as sheet metal, opaque plastic, opaque glass and the like. In general, suitable materials for the panes will be apparent to those skilled in the art given the benefit of this disclosure. Except to the extent clearly indicated otherwise below, the windowpane and transom pane of other embodiments of the vehicle window assemblies disclosed here can be formed of such materials. Transom pane 214 includes a central portion 215, which extends over at least a portion of transom opening 206, and a peripheral portion 216, which extends over the transom frame structure. Transom pane 214 has an interior surface 217, that is, a surface that faces the interior of the vehicle when the transom pane is in the closed position, an exterior surface 218 that faces away from the interior of the vehicle when the transom pane is in the closed position, and an edge 219. Other suitable transom panes will be readily apparent to those of skill in the art, given the benefit of this disclosure.

Windowpane 7 may similarly be formed of glass, tempered glass, laminated glass, clear plastic and the like, and may optionally be tinted, or may optionally be formed of an opaque material. Other suitable windowpanes will be readily apparent to those of skill in the art, given the benefit of this disclosure. Windowpane 7 includes a central portion 30, which extends over at least a portion of window opening 6, and a peripheral portion 32, which extends in at least one direction beyond window opening 6 to at least partially overlap vehicle body 5. Optionally, peripheral portions 32 are fritted to obscure the view from the exterior of the vehicle of the framework concealed behind it. Windowpane 7 has an interior surface 34, that is, a surface that faces the interior of the vehicle, an exterior surface 36 that faces the exterior of the vehicle, and a peripheral edge surface 38. It will of course be understood that references to portions of the windowpane facing the interior and/or exterior of the vehicle refer to circumstances in which the window, if it is of the egress type, is closed.

Figure 4:
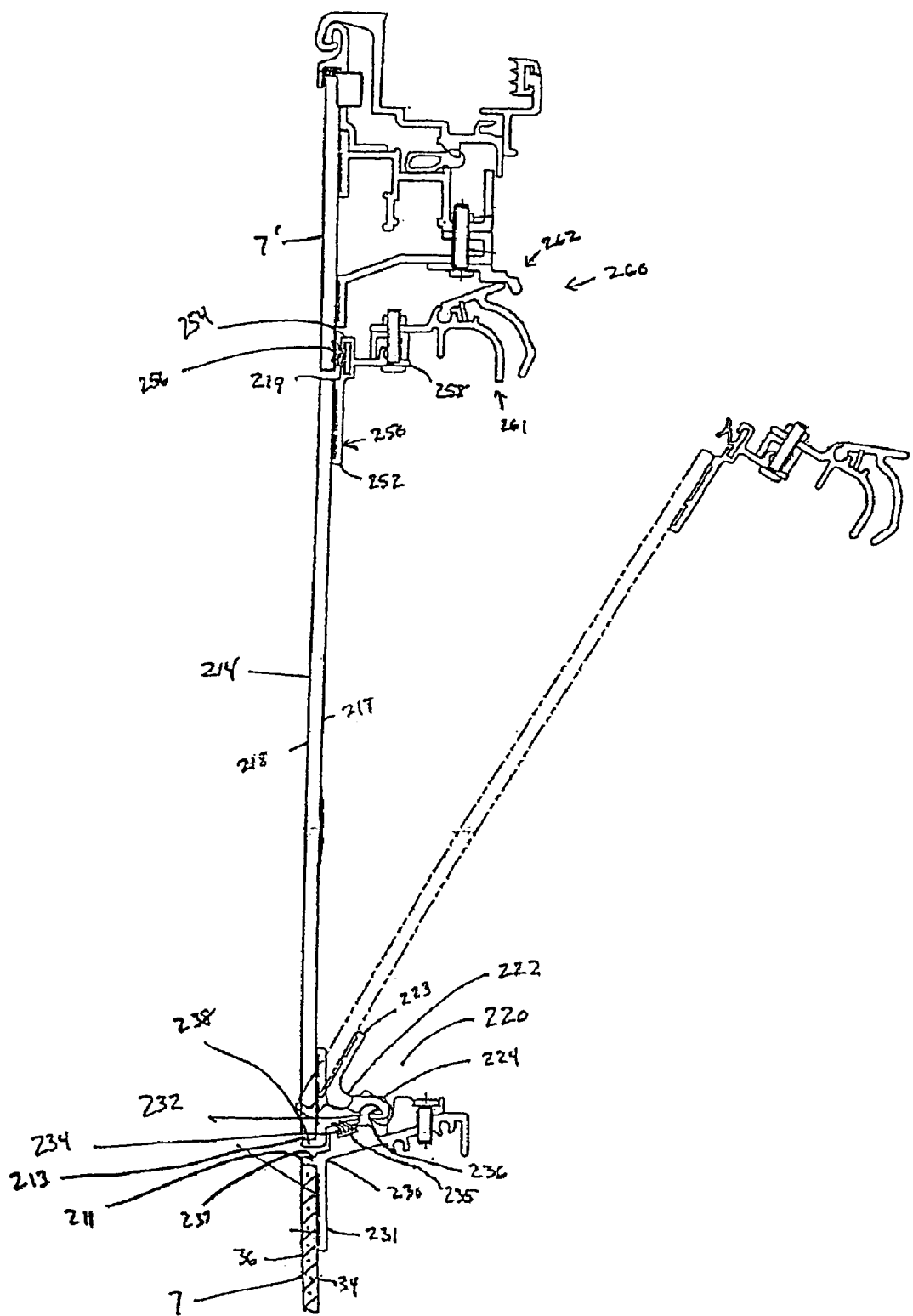
FIG. 4 is an enlarged cross-section view, taken along line 4-4 of FIG. 1, partially broken away, showing a latch mechanism of the vehicle window assembly of FIG. 1, with the solid lines indicating the transom pane in a closed position and the dashed lines indicating the transom pane in an open position.
Figure 5:
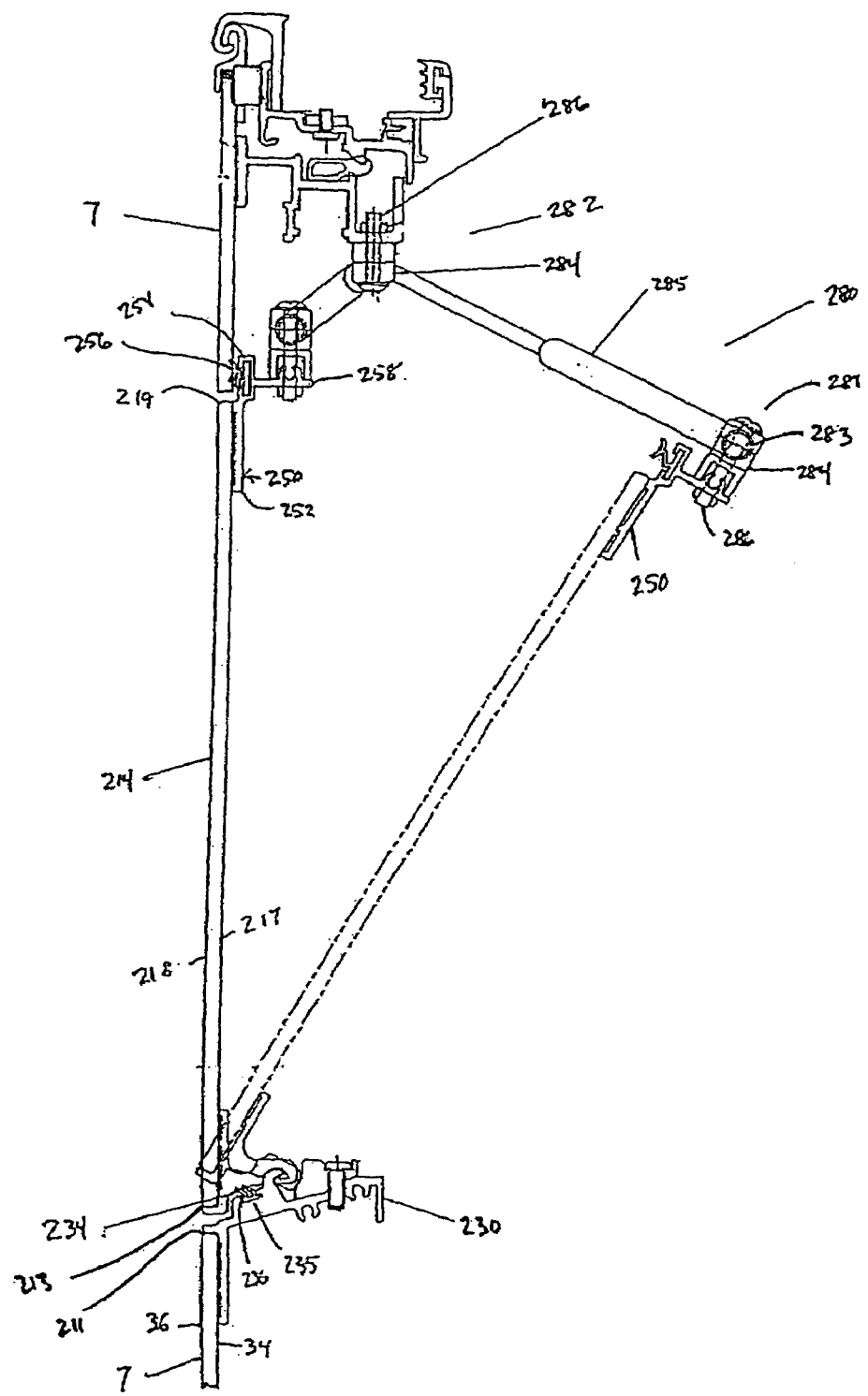
FIG. 5 is a side view, partially in section and partially broken away, taken along line 5-5 of FIG. 1, showing the transom window stop mechanism of the openable transom vehicle window assembly of FIG. 1, with the solid lines indicating the transom pane in a closed position and the dashed lines indicating the transom pane in an open position.

The lower edge 213 of transom pane 214 lies generally parallel with and adjacent to the transom opening edge 211 of windowpane 7. Typically the transom pane and the windowpane are in an abutting relationship to each other along lower edge 211 and transom opening edge 213, respectively. It will be understood by those skilled in the art that the windowpane and transom pane are in an abutting relationship where, as seen in FIGS. 4 and 5, a portion 238 of the first hinge portion 222 and/or a portion 237 of second hinge portion 230 is interposed between the windowpane and the transom pane. Other suitable relative arrangements of the transom pane and windowpane will be readily apparent to those skilled in the art, given this disclosure.

Transom pane 214 is hingedly attached to windowpane 7 by transom hinge 220 such that the transom pane can be swung from a closed position to an open position, as illustrated in FIGS. 4 and 5. Typically, the transom pane will be attached such that the transom pane swings inwardly, that is to say, towards the interior of the vehicle. Alternatively, the transom window assembly can be configured such that the transom pane swings outwardly if desired. Transom hinge 220 is typically located such that transom pane pivots about an axis that runs parallel to transom opening edge 21 land lower edge 213, such that transom pane 214 opens by pivoting inwardly and downwardly. In a highly advantageous feature, the transom hinge is attached to the windowpane and to the transom pane such that no part of the transom hinge extends outwardly beyond the plane defined by the outer or exterior surface of the windowpane. Other suitable transom hinge arrangements will be readily apparent to those of skill in the art, given this disclosure.

Transom hinge 220 comprises a first transom hinge portion 222 that is attached to the transom pane 214 and a second transom hinge portion 230 that is attached to the windowpane. First transom hinge portion 222 comprises a mounting portion 223 and a hook-shaped extension 224 extending inwardly. Second transom hinge portion 230 comprises a mounting portion 231 and a hook-shaped flange 232 extending inwardly. In certain embodiments, either or both of first transom hinge portion 222 and second transom hinge portion 230 further comprise a bumper or seal 234. Such a seal advantageously contacts the opposite transom hinge portion from the one to which it is attached, so as to dampen vibrations of the transom pane, to reduce noise, for example, wind noise, and to add to the watertightness of the transom pane/windowpane junction. Seal 234 may be formed, for example, with an adhesive on one side to adhere to second hinge portion 230, or may reside in a seal channel 235 that retains the seal by means of retention arms 236. Suitable materials for seal 234 include, for example, foam rubber, thermoplastic rubber, ethylene-propylene terpolymer (EPDM), any elastomeric material, rubber, or other flexible material. Other suitable materials and configurations will become readily apparent to those skilled in the art, given the benefit of this disclosure.

Figure 18:
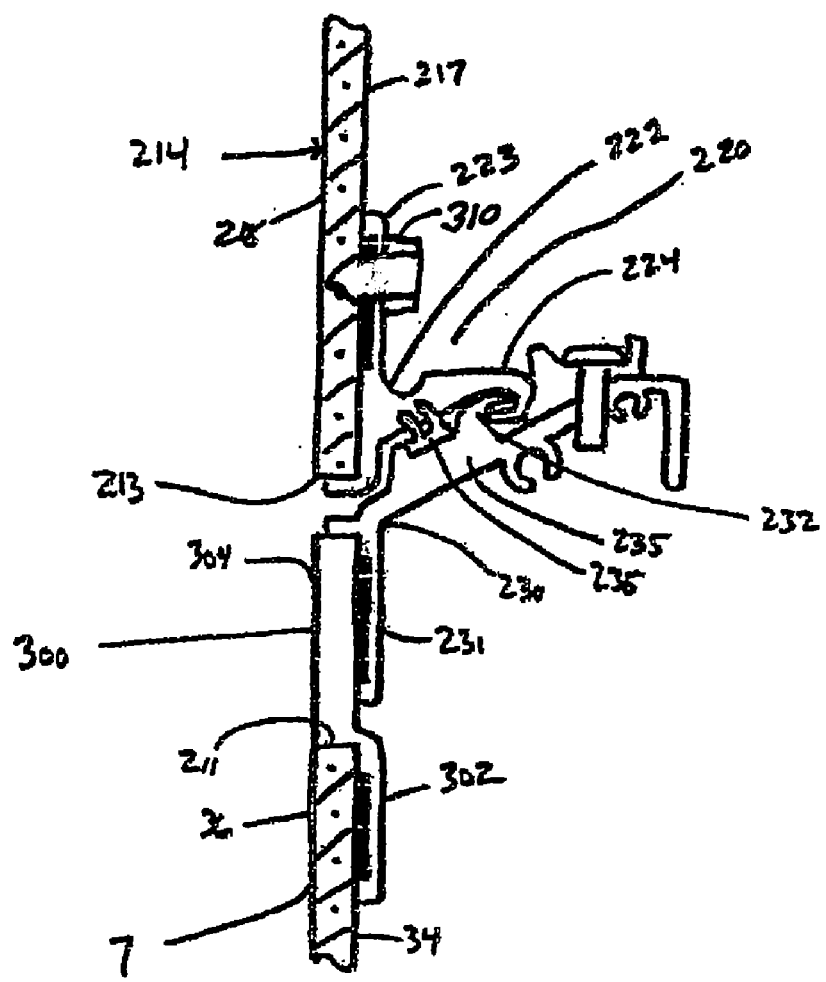
FIG. 18 is a view partially in section and partially broken away of another alternative embodiment of the egress latch assembly of FIG. 9, showing a hinge member mounted by a fastener.

The mounting portions 223 and 231 of the first transom hinge portion 222 and second transom hinge portion 230 are suitable for direct attachment to the transom pane and the windowpane, respectively, by means of adhesive 58. This adhesive in certain embodiments is formed of a primer layer applied to windowpane 7 or transom pane 214, a primer layer applied to mounting portion 231 or mounting portion 223, and an adhesive, for example a urethane adhesive. Other suitable adhesives include moisture-activated urethanes, moisture-activated silicones, thermally-activated silicones, moisture-curable hot melt urethanes, thermally-activated modified epoxy, chemically-activated acrylate, thermally-activated nitrile phenolic adhesives, e.g. silyl-modified polymer such as Simson ISR 70-08, available from Bostik-Findley (Middleton, Mass.), and the like. Other suitable adhesives will become readily apparent to those skilled in the art, given the benefit of this disclosure. Mounting portions 223 and 231 are advantageously adhesively bonded only to interior surfaces 217 and 34 of transom pane 214 and windowpane 7, respectively so that outer surfaces 218, 36 of the transom pane and the windowpane, respectively, are uncovered and uninterrupted by any part of the hinge or its attachment means. Additionally, both transom pane 214 and windowpane 7 may be flush with the exterior surface of an outer skin 35 of the vehicle, where peripheral edge 38 of pane 7 is seated against a shoulder 37 formed in outer skin 35, and be flush with each other. The term "adhesive bonding," when used herein, includes embodiments where the first and second transom hinge portions are extruded directly onto the interior surfaces of transom pane 214 and windowpane 7 and allowed to cure. In certain embodiments, a dual adhesive system is used, in which a quick setting adhesive is employed to quickly hold the mounting portions to the panes, and a longer setting adhesive is employed which has more desirable properties such as adhesive strength, flex, and durability. For example, a hot melt adhesive and a urethane adhesive can be so employed. Typically, the dual adhesive system will employ separate strips of sections of adhesive rather than intermixing the adhesives. In other embodiments, fasteners are used to mount the first and/or second hinge members to their respective panes. For example, in the embodiment shown in FIG. 18, fastener 310 is seen mounting a first hinge portion to the transom pane 214. Fastener 310 does not extend through the exterior surface of transom pane 214. Other suitable methods for attaching the mounting portions to the panes will become readily apparent to those skilled in the art, given the benefit of this disclosure.

In certain embodiments, other conventional hinges may serve as the transom hinge of the window assemblies presented herein. For example, a pair of hinge members having hinge leaves that interact to surround an elongated hinge pin, such as is described in U.S. Pat. No. 6,412,225, incorporated herein in its entirety for all purposes, could be employed, as could any other conventional hinge. It is well within the ability of those skilled in the art to suitably modify conventional hinges such that they can be attached to the interior surfaces of the windowpane and transom pane with no part of the hinge extending beyond the plane defined by the exterior surface of the windowpane and/or transom pane, given the benefit of the present disclosure. Other suitable transom hinges will be readily apparent to those skilled in the art, given the present disclosure.

In certain embodiments, the transom hinge extends substantially along the entire length of the lower edge of the transom pane to better support the weight of the transom pane. In other embodiments, the transom hinge may be comprised of one or more separate hinges located at intervals along the length of the transom pane. Such a configuration would, with certain hinge designs, lead to greater ease in installation and removal of the transom pane. Suitable configurations for the transom hinge will be readily apparent to those skilled in the art, given the benefit of the present disclosure.

Figure 17:
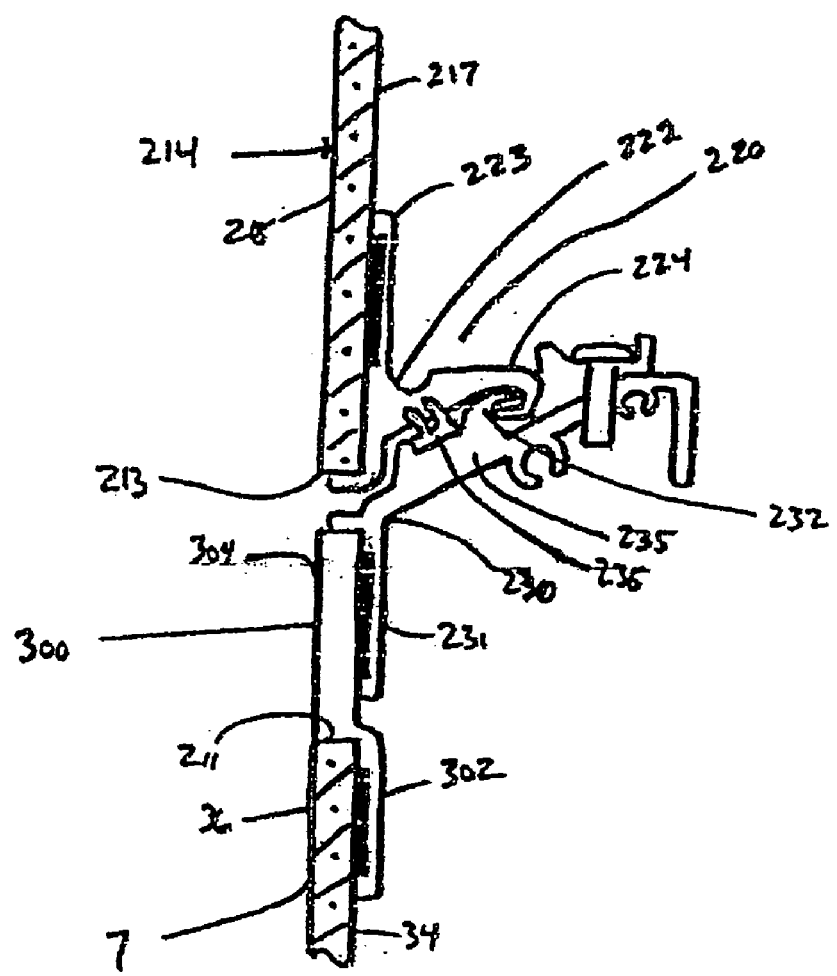
FIG. 17 is an enlarged cross-section view, partially broken away, of a vehicle window assembly having an openable transom window in accordance with an alternative embodiment.

In certain embodiments, as illustrated for example in FIG. 17, second hinge portion 230 is attached to windowpane 7 via extension strip 300, which is located between the lower edge 213 of the transom pane and the transom opening edge 211 of the windowpane. Extension strip 300 is optionally mounted to windowpane 7 by adhesive located between windowpane 7 and extension strip mounting portion 302. Suitable adhesives include any of the adhesives or combinations of adhesives described herein. On other embodiments, the extension strip is mounted by fasteners. Extension strip 300 is mounted to windowpane 7 such that no portion of extension strip 300 extends outwardly beyond the plane defined by the exterior surface 36 of the windowpane, such that the exterior surface of the windowpane remains uncovered and uninterrupted, optionally so as to enable the flush appearance described herein. In certain embodiments, an exterior surface 304 of extension strip 300 is substantially flush with the exterior surface 36 of windowpane 7 to add to the flush appearance of the vehicle window assembly. Extension strip 300 may be comprised of metal, plastic, glass, or any other suitable material or combination of materials. It will be understood that in such an embodiment, lower edge 213 of the transom pane and transom opening edge 211 of the windowpane, respectively, are considered to be adjacent. In other embodiments, the extension strip may be adhered to the transom opening edge 211 of the windowpane, or may be itself attached to a separate mounting element that is attached to the windowpane, provided that no portion of these components extends outwardly beyond the plane defined by the exterior surface of the windowpane. Other suitable strip configurations and attachment means will be readily apparent to those of skill in the art, given this disclosure.

Figure 7:
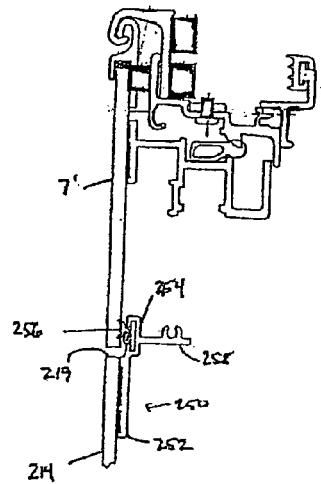
FIG. 7 is a section view, taken along line 7-7 of FIG. 1.

The transom pane in certain embodiments, such as the embodiment illustrated in FIGS. 4, 5 and 7, comprises a transom window frame 250 mounted to the interior surface 217 of the transom pane and not extending outwardly beyond the plane defined by the exterior surface 218 of the transom pane. The transom window frame may extend around a portion of, or around the entire periphery of the transom pane 214. Transom window frame 250 may be formed of any suitable material, such as, for example, injection molded thermoplastic or structural metal, e.g., aluminum. Other suitable materials for transom window frame 250 will become readily apparent to those skilled in the art, given the benefit of this disclosure. The transom window frame 250 includes a mounting flange 252 that extends substantially parallel to the interior surface 217 of the transom pane and that is suitable for attachment to the transom pane, optionally by means of adhesive 58, which can be any of those adhesives or combination of adhesives described herein. The first hinge portion may in certain embodiments be unitary with the transom window frame; for example, the transom window frame of FIGS. 4, 5 and 7 is unitary with the first transom hinge portion of transom hinge 220, with the hook-shaped extension 224 unitary with the transom window frame. Optionally the hook-shaped extension, or other suitable hinge section that interacts with the second hinge member to form a hinged joint, may be attached to or integral with the transom window frame, for example, by means of adhesive or fasteners. Other suitable transom window frames will be readily apparent to those skilled in the art, given the benefit of this disclosure.

In certain embodiments, the transom window frame has an extension 254 extending parallel to the mounting flange to reside behind the windowpane 7 or panel 212 adjacent that edge of the transom pane. Extension 254 may in certain embodiments have a seal or bumper 256 attached to it and configured to contact the interior surface of the windowpane 7 or panel 212 when the transom window is in the closed position. As with seal 235, seal 256 can be adhered to, retained by or otherwise attached to extension 254, and can be comprised of any of the materials listed for seal 235. In certain embodiments, transom window frame 250 further comprises a mounting extension 258 extending inwardly. Mounting extension 258 serves as a platform on which to mount a latch portion or a transom window stop portion, each of which is discussed in greater detail below. Mounting extension 258 may extend along the entire length of the transom window frame. Alternatively, the mounting extension may extend only along those portions at which it is employed for mounting further structure. Other suitable mounting extension configurations will be readily apparent to those of skill in the art, given the benefit of this disclosure.

Transom window frame 250 may be formed as a unitary structure, that is, a structure of one-piece construction. Alternatively, transom window frame 250 may be formed of two or more pieces that are joined at time of installation. Both mounting extension 258 and extension 254 may be unitary with transom window frame 250, or may be separate pieces that are attached to the transom window frame by known means, such as by welding or with adhesives or fasteners. Other suitable configurations for the transom frame will be readily apparent to those skilled in the art, given the benefit of this disclosure.

In certain embodiments, the flush transom window assembly has a transom latch for latching the transom window in a closed position. An exemplary transom latch is illustrated in FIG. 4, in which latch 260 is made up of a first transom latch portion 261 and a second transom latch portion 262. First transom latch portion 261 is mounted to the transom pane 214 by being attached to mounting extension 258. First transom latch portion 261 comprises a first flange 264 extending inwardly. A latch flange 266 is pivotably connected to the first flange. Latch flange 266 may be pivotably attached to first flange 264 by any known means; in FIG. 4, the latch flange terminates at the outward end in a pivoting portion 267 of substantially circular cross-section, which resides in a substantially circular groove 268 located on first flange 264. The latch flange is urged towards a first, latched position by means of a spring 269, which may be a coil spring, leaf spring, or any other known spring-like mechanism. The spring 269 may be unitary with either the latch flange or the first flange, or may be a separate piece attached to either flange by any suitable means. Latch flange 266 further includes a latch extension 270. Second transom latch portion 262 is mounted to window frame 40, either directly or indirectly, and includes latch striker 271. In certain embodiments, second transom latch portion 262 further includes a mounting flange 272, which is adhered to the interior surface of the windowpane 7 or panel 212 that resides above the transom opening. A latch striker support 273 extends inwardly from mounting flange 272, to which latch striker 271 is attached. Advantageously, a portion 277 of latch striker support 273 will reside against window frame 40 to provide additional bracing and support, and such a portion may be attached to window frame 40 if desired. Latch striker 271 thereby interacts with latch extension 270 when the latch is in the closed position, with latch extension 270 held in the latched position by the urging of the spring 269. To open the transom window, latch flange 266 is pivoted about pivoting portion 267 against the force of the spring to disengage latch extension 270 from latch striker 271. The transom pane can then be swung open. To close the transom pane, the operator merely needs to pivot the pane shut; the configuration preferably enables the force of the closing pane to compress the spring sufficiently for the latch extension to pass under the latch striker, at which point the spring will urge the latch extension back up to a position to engage the latch striker and latch the transom pane. Such self-latching feature may be referred to as a "snap shut" feature. Other suitable latch configurations will be readily apparent to those of skill in the art, given the benefit of the present disclosure.

In certain embodiments, the window assembly further comprises a transom window stop. The transom window stop operates to prevent the transom pane from opening beyond a certain point or beyond a certain distance, by, for example, limiting the arc through which the transom pane can swing when being moved from a closed to an open position. Typically, the transom window stop will be attached to the transom pane at a first end of the transom stop and to either the windowpane, the window frame, or the vehicle wall at a second end of the transom stop. The first end attached to the transom pane is adhered to or otherwise attached to the transom pane such that no part of the transom window stop extends outwardly beyond the plane defined by the exterior surface of the transom pane, and in certain embodiments such that no part of the transom window stop extends outwardly beyond the plane defined by the interior surface of the transom pane. Where the second end of the transom window stop is attached to the windowpane, it will in certain embodiments be adhered to or otherwise attached to the windowpane such that no part of the transom window stop extends outwardly beyond the plane defined by the exterior surface of the windowpane, and in certain embodiments such that no part of the transom window stop extends outwardly beyond the plane defined by the interior surface of the windowpane. In this fashion, no part of the transom window stop will extend through the exterior plane defined by the outer surface of the windowpane to disrupt the flush appearance of the window assembly.

Figure 6:
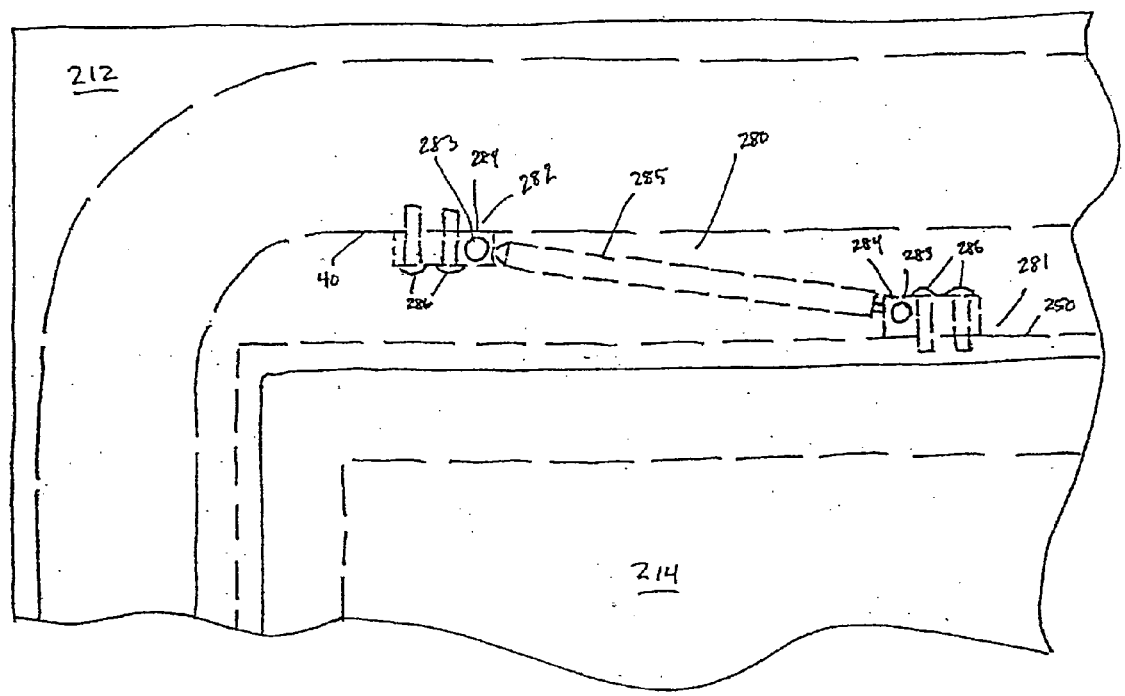
FIG. 6 is an enlarged view of the upper left portion of the openable transom vehicle window assembly of FIG. 1.

The transom window stop may be of any suitable construction. In certain embodiments, for example as illustrated in FIGS. 5 and 6, the transom window stop comprises a spring plunger assembly 280 in which a spring plunger 285 is attached to the transom window frame 250 at a first end 281 and to window frame 40 at a second end 282. The connection at each end is by means of a ball socket 283 and a ball socket retainer 284, such that the spring plunger can rotate and change angle relative to each of the transom window frame and the window frame. Typically ball socket retainers 284 will be attached to the transom window frame 250 and the window frame 40 by means of fasteners 286. Other suitable attachment means, such as, for example, adhesives, welds, etc., will be readily apparent to those skilled in the art, given this disclosure. When the transom pane is in a closed position, the spring plunger would be fully or substantially fully compressed, as illustrated in the solid lines of FIG. 5. Upon opening the transom pane, the spring plunger would extend until it reached its maximum extension length, at which point the transom pane could not be opened further. Thus, the extended length of the spring plunger determines, in combination with the positioning of the ball socket retainers relative to each other, the maximum amount that the transom window could be opened. Advantageously, the spring plunger will not be fully compressed when the transom window is fully closed, and will undergo a small degree of further compression when the transom window is initially opened, resulting in the spring plunger pulling the window shut when it is nearly closed, assisting in the snap-shut feature described above. Such can be accomplished, for example, by staggering the position of the two ball socket retainers 284 so that the ball socket retainer of the first end 281 is closer to the exterior of the vehicle than is the ball socket retainer of the second end 282. While certain illustrated embodiments have two spring plungers anchored near the center of the top edge of the transom window, one of skill in the art will recognize that a single spring plunger could be employed and that the plunger could be anchored at any suitable points on both the transom pane and the windowpane, window frame, or other supporting structure that would permit opening of the transom window. Similarly, more than two of such spring plungers could be employed. A piston or other such device could likewise be employed in place of the spring plunger. Where the window assembly is of the egress or openable type, the transom window stop is preferably anchored at its second end to the windowpane or window frame such that it does not impede the opening of the windowpane itself. Other suitable transom window stop configurations, such as, for example, chains, tethers, and the like will be readily apparent to those skilled in the art, given the benefit of the present disclosure.

Certain embodiments of vehicle window assemblies include a backframe 4 that fits around a window opening 6 that is defined by the body 5 of a vehicle 3. Backframe 4 is optionally secured to body 5 by adhesive, and a windowpane 7 is positioned within backframe 4. In certain embodiments, the windowpane 7 overlaps backframe 4 to effectively overlay frame 4 when observed from outside of the vehicle. Backframe 4 includes a header 8, a footer 10, a pair of sides or jambs 12, and optionally corner pieces 14. Backframe 4 may be formed as a unitary structure, that is, a structure of one-piece construction, installable into window opening 6 from the exterior, with trim molding 20 added separately or formed as a unitary part of backframe 4. Alternatively, backframe 4 may be formed of two or more pieces that are joined prior to or at time of installation, either with or without trim molding 20 being unitary with the pieces that form backframe 4. It will be understood that window shapes that are not substantially square, rectangular, or rectilinear may be employed. Where such a window shape is utilized, the backframe may lack components that are definable as a header, a footer, or jambs, and will instead be designed to fit the specific shape of the window opening. Alternative embodiments of the backframe will be readily apparent to those of skill in the art, given the benefit of the present disclosure.

Figure 3A:
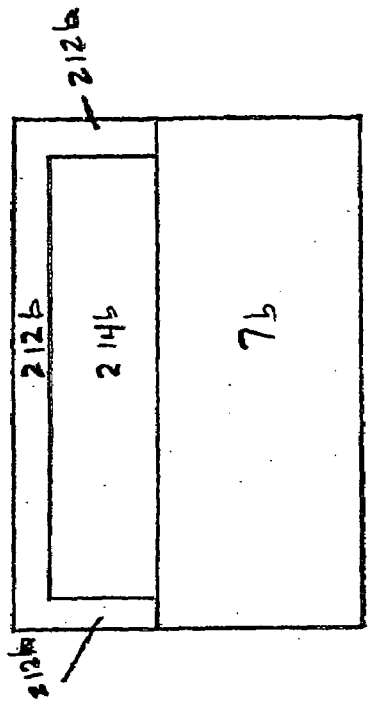
FIG. 3A is a schematic of an alternative embodiment of a vehicle window assembly having an openable transom pane in accordance with the present invention.
Figure 3B:
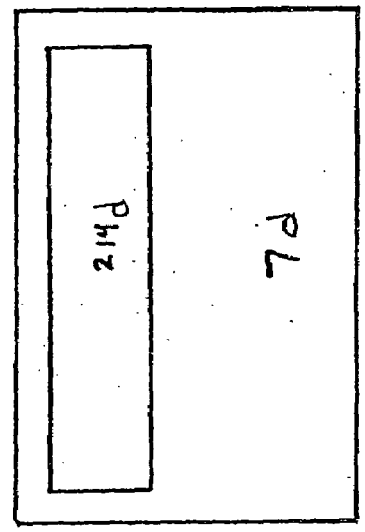
FIG. 3B is a schematic of an alternative embodiment of a vehicle window assembly having an openable transom pane in accordance with the present invention.
Figure 3C:
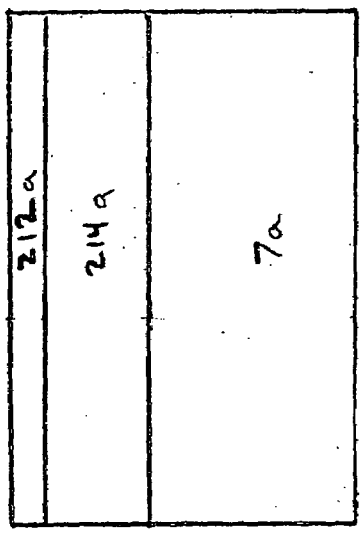
FIG. 3C is a schematic of an alternative embodiment of a vehicle window assembly having an openable transom pane in accordance with the present invention.
Figure 3D:
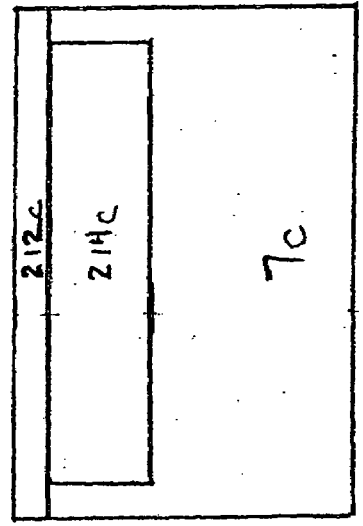
FIG. 3D is a schematic of an alternative embodiment of a vehicle window assembly having an openable transom pane in accordance with the present invention.

The transom pane in certain embodiments will reside within a transom opening 206. As noted above, the transom pane and the windowpane share at least one adjacent edge. As noted above, the lower edge of the transom pane will be adjacent the transom opening edge of the windowpane. In certain embodiments, for example those illustrated in FIGS. 3C and 3D, windowpanes 7C and 7D have at least one additional edge adjacent to at least a second edge of transom panes 214C and 214D. In other embodiments, such as, for example, those illustrated in FIGS. 3A, 3B and 3C, the vehicle window assembly further comprises a panel 212A, 212B, 212C having at least one edge that is adjacent to at least a second edge of transom pane 214A, 214B and 214C. One or more separate panels or panes may be employed in place of the single panels 212A, 212B and 212C of these illustrations. The panel or panels may be comprised of glass, or instead may be metal, plastic, or any other suitable material or combination of materials. It will be understood that for transom window shapes that are not substantially square, rectangular, or rectilinear, transom opening 206 will typically have a corresponding shape, and that transom window assemblies in accordance with the present invention for such alternate window shapes will have suitable frames, hinges, latches, panels etc., designed to fit the specific shape of the window opening. Other suitable configurations defining the transom opening will be readily apparent to those of skill in the art, given the benefit of the present disclosure.

In certain embodiments, window frame 40 extends along at least part of the interior surface 34 at or near the periphery of windowpane 7. Window frame 40 is attached to the interior surface 34 of windowpane 7 such that no part of the window frame extends outwardly beyond the plane defined by the exterior surface of the windowpane. Window frame 40 may be formed of plastic, for example, injection molded thermoplastic, or may be formed of a structural metal, e.g., aluminum. Other suitable materials for window frame 40 will become readily apparent to those skilled in the art, given the benefit of this disclosure. Window frame 40 extends completely along the peripheral portion of windowpane 7, and resides inwardly of peripheral edge surface 38 of windowpane 7, i.e., at least a portion of the peripheral portion 32 of windowpane 7 extends beyond the outermost edge of the window frame 40. In other embodiments, the window frame may not extend completely along the peripheral portion of windowpane 7, but instead may be comprised of one or more sections that extend along portions of the peripheral portion of the windowpane. Other suitable window frame configurations will be readily apparent to those skilled in the art, given the benefit of this disclosure.

In certain embodiments, window frame 40 includes a flange 42 extending substantially parallel to the plane defined by the inner surface 34 of windowpane 7, suitable for adhesive attachment to windowpane 7. An extension 44 extending substantially perpendicularly to flange 42 towards the interior of the vehicle contains optional seal channel 46 for receiving an optional window frame seal 48, which is typically formed of rubber or plastic. Window frame 40 further includes a channel 50, with the walls of channel 50 being substantially parallel to the plane defined by the interior and exterior surfaces 34, 36 of windowpane 7. Channel 50 opens substantially away from the center of pane 7. Optionally, a second flange 52 extends from extension 44 in the same direction as flange 42. Second flange 52 may serve to support a second pane (not shown), which could be adhesively attached to second flange 52. Alternatively, a second pane could extend between second flange 52 and channel 50, being held in place by a gasket (not shown) that is retained by optional grooves 54 formed in second flange 52 and in the wall of channel 50. Other suitable window frame configurations for mounting one or more windowpanes will be readily apparent to those skilled in the art, given the benefit of this disclosure.

Window frame 40 may be bonded to windowpane 7 at flange 42 by means of adhesive 58. This adhesive in certain embodiments is formed of a primer layer applied to windowpane 7, a primer layer applied to window frame 40, and an adhesive bonding the two together at the locations of the primer layers. Suitable adhesives include urethane adhesives, moisture-activated urethanes, moisture-activated silicones, thermally-activated silicones, moisture-curable hot melt urethanes, thermally-activated modified epoxy, chemically-activated acrylate, and thermally-activated nitrile phenolic adhesives. Other suitable adhesives will become readily apparent to those skilled in the art, given the benefit of this disclosure. Window frame 40 is advantageously adhesively bonded or otherwise attached only to interior surface 34 of windowpane 7 so that windowpane 7 may be flush with the exterior surface of an outer skin 35 of the vehicle, in other words, so that no part of the window frame extends outwardly beyond the plane defined by the exterior surface of the windowpane. The term "adhesive bonding," as noted above, includes embodiments where item to be bonded is extruded directly onto the interior surface of the item to which it is to be bound and allowed to cure.

The vehicle window assembly 2, including backframe 4, may be fixed in place; that is to say, the vehicle window assembly may be mounted in the window opening such that the windowpane itself remains fixed, while the transom pane may be opened and closed. Optionally, the vehicle window assembly may be pivotable from a closed position to an open position. Such a feature would be desirable where the vehicle window assembly was to be used as, for example, an egress window, or to advantageously permit the vehicle user the option of opening the entire window if desired. The vehicle window assembly can be configured to be openable in accordance with any of U.S. Pat. Nos. 5,551,197, 6,164,715, 6,312,043, 6,412,225, Canadian Patent No. 1,057,796, or Canadian Patent Application No. 2,258,314, hereby incorporated herein in their entireties for all purposes, or advantageously in accordance with U.S. patent application Ser. No. 10/024,617, entitled "Flush Egress Window Assembly," filed on Dec. 18, 2001, the disclosure of which is hereby incorporated in its entirety for all purposes.

Figure 8:
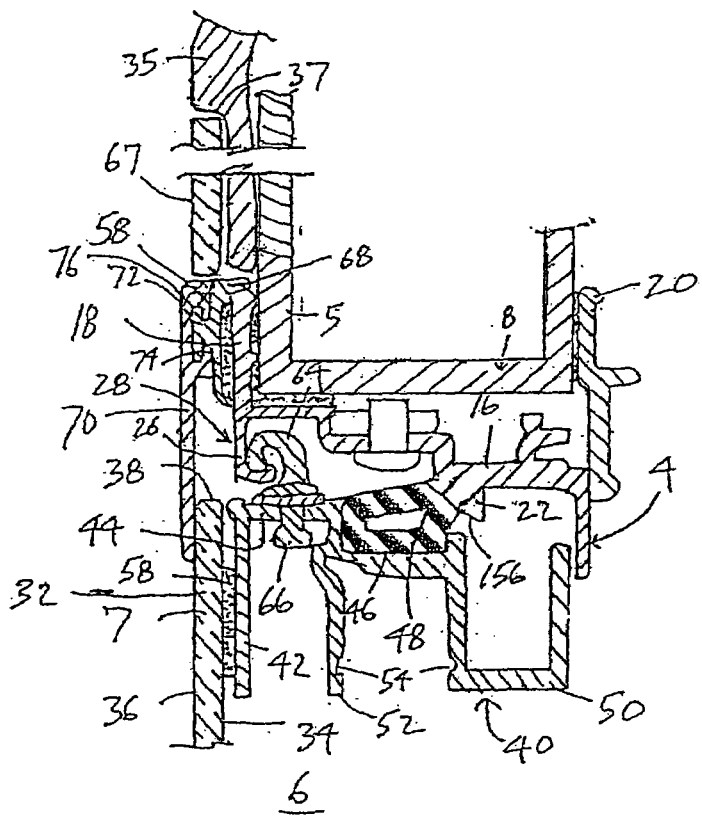
FIG. 8 is a section view, partially broken away, of an egress hinge mechanism of an egress window assembly for a motor vehicle in accordance with an alternative embodiment of the present invention.

In the embodiment shown in FIG. 8, window frame 40 is connected to backframe 4 via egress hinge 28 so as to allow the windowpane, transom pane and one or more panels, where such are included, to together pivot outwardly of the vehicle to permit passengers to exit the vehicle, making vehicle window assembly 2 suitable for use as an emergency egress window. A hook-shaped extension 64 is attached by rivets 66 to perpendicular extension 44 of window frame 40 such that the hook side faces the exterior of the vehicle, that is, away from the interior of the vehicle. Hook-shaped extension 64 is hooked to the hook-shaped flange 26 of backframe 4, typically at the header portion of backframe 4. The hook-shaped extension 64 acts cooperatively with the hook-shaped flange 26 to support the window and permit it to be swung outwardly from a closed position over a sufficient distance to permit occupants of the vehicle to pass through the window opening. In certain embodiments, the window can be swung outwardly further until hook-shaped extension 64 disengages from hook-shaped flange 26, thus permitting the window to be removed without the use of tools. Since egress hinge 28 is secured to windowpane 7 via window frame 40, it is adhesively bonded or otherwise attached only to the interior surface of windowpane 7, allowing the flush look of the window described above. Alternatively, any conventional hinge, such as those described in U.S. Pat. Nos. 6,412,225, 5,551,197, 6,164,715, 6,312,043, 6,412,225, Canadian Patent No. 1,057,796, or Canadian Patent Application No. 2,258,314, may be used.

The egress window assembly will typically have an egress latch to hold the window in a closed position. In certain preferred embodiments, as seen in FIGS. 9-16, egress latch assembly 80 is slidingly mounted to windowpane 7 proximate peripheral edge surface 38 for movement between a first position and a second position in a plane substantially parallel to a plane defined by windowpane 7. A suitable latch assembly is described in commonly owned U.S. application Ser. No. 10/008,302, entitled Egress Window Latching Mechanism, filed on Dec. 7, 2001, the entire disclosure of which is incorporated herein by reference for all purposes. Egress latch assembly 80 includes a latch bolt housing 82. Egress latch assembly 80 is secured to or formed as part of window frame 40, and, therefore, is bonded only to the interior surface 34 of windowpane 7. Egress latch assembly 80 accordingly travels with windowpane 7 when the window is opened and closed.

Latch bolt housing 82 is preferably formed of injection molded thermoplastic or a structural metal, e.g., aluminum. Other appropriate materials for latch bolt housing 82 will become readily apparent to those skilled in the art, given the benefit of this disclosure. Latch bolt housing 82 defines a cavity 84 having two side surfaces 86, a top surface 88, and, optionally, a back surface 90. Cavity 84 opens in a direction extending away from peripheral edge surface 38 of pane 7 and in a direction extending away from back surface 90.

Egress latch assembly 80 includes a latch bolt 78 positioned in cavity 84. Latch bolt 78 has a front surface 92, a back surface 94, two side surfaces 96, a top surface 97, and a bottom surface 102. In certain embodiments, side surfaces 96 of latch bolt 78, as well as side surfaces 86 of cavity 84, may contain recesses 98 (shown in FIG. 13 on side surface 96) so as to reduce the amount of surface area that will come in contact with other members, thereby reducing friction and the force required to operate the latch. Other suitable configurations for the latch bolt will be readily apparent to those of skill in the art, given the benefit of this disclosure.

A biasing member such as a spring 114 is connected at a first end 116 to back surface 94 of latch bolt 78 and is connected at a second end 118 to back surface 90 of cavity 84. In other embodiments, for example, embodiments where the cavity has no back surface, the spring can be connected at its second end to a spring pin extending across the cavity in similar fashion as the mounting pins described below. Spring 114 serves to bias the latch bolt 78 to a first, typically closed, position, shown in FIG. 13. The biasing member may be, as noted above, a spring, e.g., a coil spring or leaf spring, or it may alternatively be elastic or resilient bands. Other suitable means for biasing the latch bolt to the first position will be readily apparent to those skilled in the art, given the benefits of this disclosure.

Figure 10:
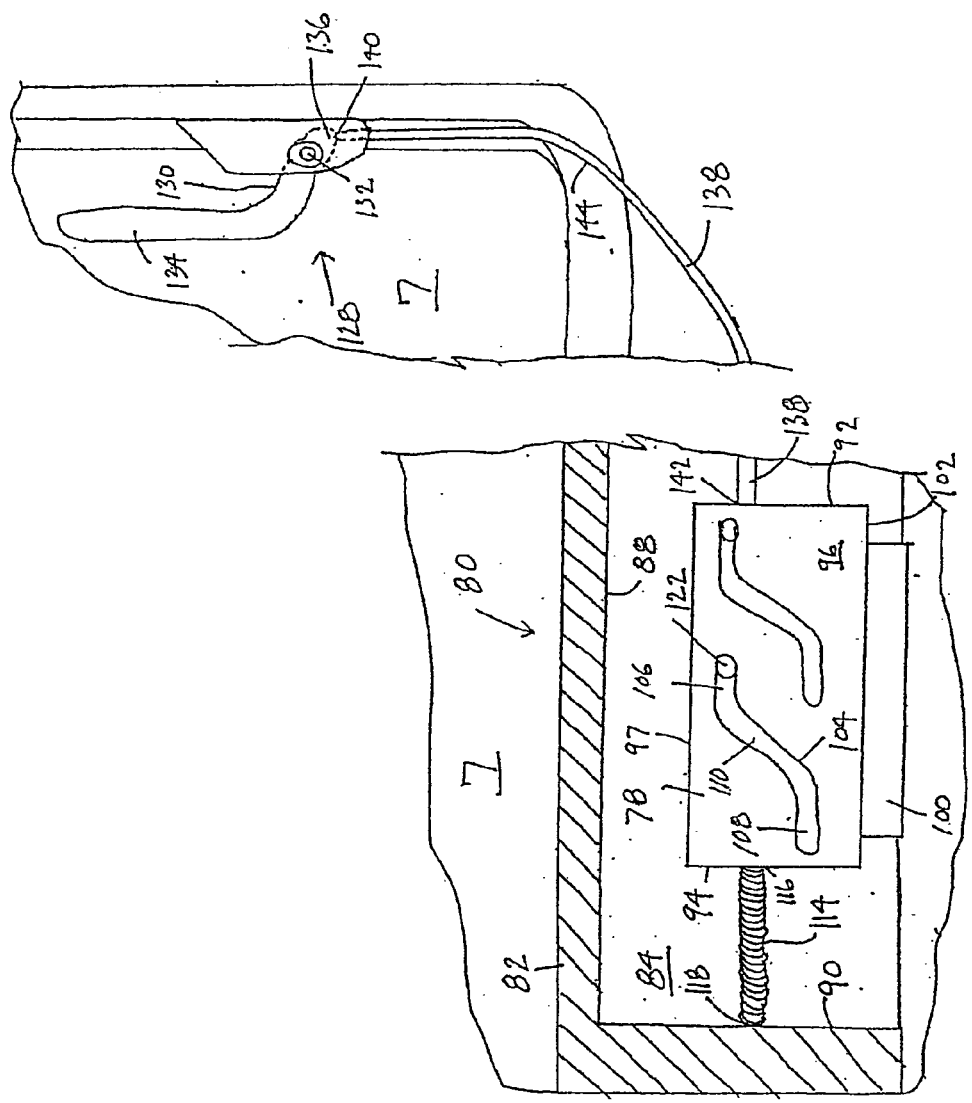
FIG. 10 is an elevation view, partially broken away, of the egress latch assembly of FIG. 9.
Figure 11:
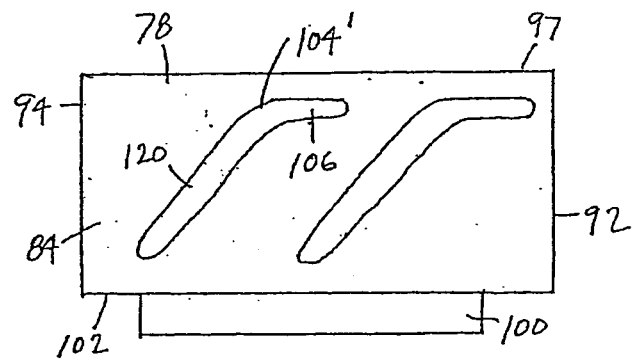
FIG. 11 is an elevation view of an alternative embodiment of the latch bolt of the egress latch assembly of FIG. 9.

One or more, for example, two, compound mounting pin slots 104 extend through latch bolt 78. The term compound mounting pin slot, when used herein, refers to a slot that has an angular, serpentine or curvilinear shape, and is not monolinear, that is, it does not have the form of a straight line. In certain embodiments, for example, embodiments as represented by FIG. 10, compound mounting pin slots 104 are formed of a first segment 106 extending from a position proximate front surface 92 and top surface 97, toward back surface 94, substantially parallel to peripheral edge surface 38 of pane 7. A second segment 108 extends from a position proximate bottom surface 102 and back surface 94, toward front surface 92, laterally offset from first segment 106 and substantially parallel to peripheral edge surface 38 and first segment 106. A third segment 110 connects first segment 106 to second segment 108, and extends at an angle with respect to peripheral edge surface 38 and first and second segments 106, 108. In other embodiments, such as that illustrated in FIG. 11, where greater closing forces are required, compound mounting pin slots 104' may be formed of a first segment 106 extending from a position proximate front surface 92 and top surface 97, toward back surface 94, substantially parallel to peripheral edge surface 38, and a second segment 120 extending from a position proximate bottom surface 102 and back surface 94 to first segment 106 at an angle with respect to peripheral edge surface 38 and first segment 106. Other configurations for the compound mounting pin slots including, for example, curvilinear slots or slots comprising multiple curvilinear segments; which would result in the latch bolt, upon being actuated as described below, moving in a forward and upward direction, will be readily apparent to those skilled in the art, given the benefit of this disclosure.

Figure 9:
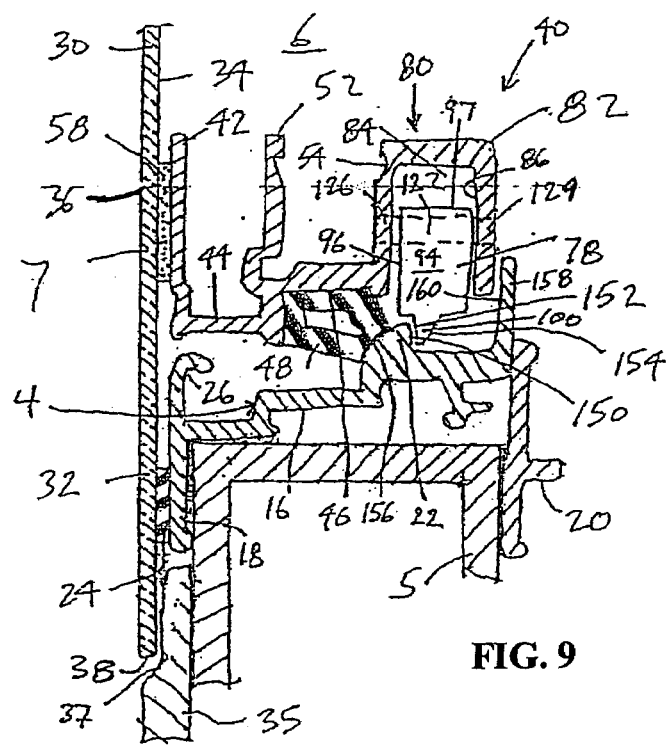
FIG. 9 is a section view, partially broken away, showing an egress latch assembly of an egress window assembly for a motor vehicle in accordance with an alternative embodiment of the present invention.

In certain embodiments, as seen in FIGS. 9-10, two, mounting pins 122 are attached at first ends 124 to a side surface 86 of cavity 84, and extend substantially perpendicular to the plane of the pane 7 into cavity 84. Each mounting pin 122 extends through a corresponding compound mounting pin slot 104 to slidingly mount latch bolt 78 to latch bolt housing 82. Of course, it will be apparent to those skilled I the art, given this disclosure, that other numbers of mounting pins may be used, for example, one mounting pin or three or more mounting pins. Mounting pins 122 typically comprise aluminum, steel, or other metal, and can be attached by any conventional method, e.g., welding. Alternatively, mounting pins 122 may be bolts extending through holes formed in the latch bolt housing and held in place by nuts. Other suitable materials for the mounting pins and attachment means will be readily apparent to those skilled in the art, given the benefit of the present disclosure.

In certain embodiments, such as the one illustrated in FIG. 9, mounting pins 122 are attached at second ends 126 to the opposing side surface 86 of cavity 84. In other embodiments, mounting pins 122 are attached only at a first end 124 to a side surface 86. In such an embodiment, a second end 126 of a mounting pin 122 extends only into a compound mounting pin slot 104, and does not extend completely through latch bolt 78. Consequently, in such an embodiment, compound mounting pin slots 104 need not extend entirely through latch bolt 78, but, rather, need to extend only far enough to accommodate the length of mounting pin 122. Further, in such an embodiment, mounting pin 122 may be attached to either side surface 86 of cavity 84. Other suitable configurations for the mounting pin and compound mounting pin slot will be readily apparent to those skilled in the art, given the benefit of the present disclosure.

As seen in FIG. 10, a release mechanism 128 remote from latch bolt 78 is used to move latch bolt 78 from the first position toward the second position. Release mechanism 128 includes a release handle 130. In certain embodiments, release handle 130 is pivotally mounted at pivot pin 132 to pane 7 remote from latch bolt 78, that is, release handle 130 is not directly rigidly affixed to latch bolt 78. However, it is understood that release handle 130 is connected to latch bolt 78, either directly or indirectly, as described below with respect to a preferred embodiment. Release handle 130 extends in an upward direction when the latch is in the closed position. A cam 136 is attached to handle 130 and pivots around pivot pin 132. An actuating cable 138 is attached at a first end 140 to cam 136 and at a second end 142 to front surface 92 of latch bolt 78. In certain embodiments, actuating cable 138 runs along a directional channel 144 that translates the direction of actuating cable 138 from its attachment at cam 136 to the attachment at latch bolt 78 so that actuating cable 138 runs in a horizontal fashion from directional channel 144, substantially parallel to peripheral edge surface 38, to latch bolt 78. The release handle need not be remote from the latch bolt, and incorporates any mechanism for biasing the latch bolt into a second, unlatched position. Other suitable release handles, and other suitable means for moving the latch bolt from the first position toward the second position, will be readily apparent to those skilled in the art, given the benefit of this disclosure.

Release handle 130 is capable of rotating to move latch bolt 78 into the second, typically unlatched, position. In certain embodiments, release handle 130 rotates through a minimum of 45° to move latch bolt 78 from the first position to the second position, which is advantageous in that the average user associates such a degree of rotation with unlatching a window. Consequently, the use will be more aware that the window is unlatched and ready to be opened, particularly in an emergency situation. Further, in certain embodiments, cam 136 functions to increase the leverage that release handle 130 applies to actuating cable 138 near the completion of the rotation of release handle 130, providing a noticeable lessening of force required to complete the rotation, and providing feedback via that lessening of force to the operator so that they might realize the window has become unlatched. Other suitable embodiments will be readily apparent to those skilled in the art, given this disclosure.

Latch bolt 78 has an optional beveled latch portion 100 extending downwardly from bottom surface 102. In certain embodiments, as seen in FIGS. 9 and 13-16, a shoulder 22 extends upwardly from footer 10. An engaging face 150 of shoulder 22 is engageable with an engaging face 152 of beveled latch portion 100 when latch bolt 78 is in the first position. Both engageable faces 150 and 152 optionally extend substantially vertical and parallel to the plane of pane 7. In other embodiments, engaging face 150 may form an angle slightly less than 90° with respect to jamb 10, and engaging face 152 may form the same angle with respect to bottom surface 102 of latch bolt 78, such that a slight resistance exists to the moving of latch bolt 78 from the first position to the second position as described below or such that a positive engagement is provided when latched. A second face 154 of beveled latch portion 100 and a second face 156 of shoulder 22 may be straight or optionally may be curvilinear, particularly an S-shaped curve. The two second faces 154, 156 are operable to slide over each other and permit "slam-shut" closure of the window in a self-latching fashion, that is, an open window may be slammed shut and will close, or latch, itself without further action being directed to the window or the latch assembly, as described below. Jamb 10 further includes a lip 158 having a face 160 that faces engaging face 150. When latch bolt 78 is in its latched position, face 160 engages latch bolt housing 82 such that lip 158 retains latch bolt 78 in an inboard-outboard direction. The shoulder that the beveled latch portion 100 engages may be unitary with the backframe, or in the alternative may be attached either permanently or impermanently to the backframe. The shoulder may instead be located on or unitary with a portion of the vehicle body or other suitable structural component within the vehicle. Other suitable configurations of the shoulder and of the beveled latch portion will be readily apparent to those skilled in the art, given the benefit of this disclosure.

Figure 12:
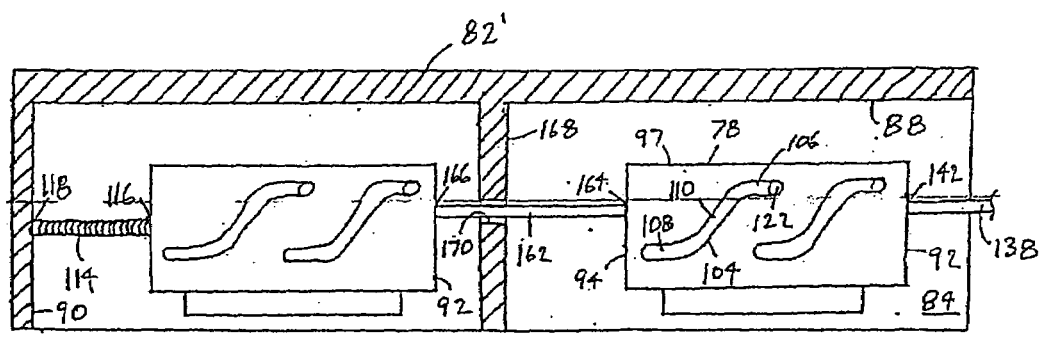
FIG. 12 is a section view, partially broken away, of an alternative embodiment of the egress latch assembly of FIG. 9.
Figure 13:
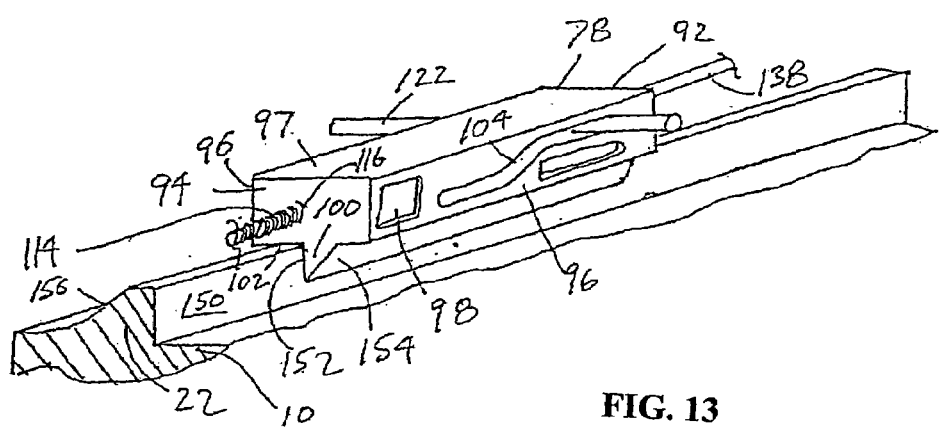
FIG. 13 is a perspective view of the latch bolt of the egress latch assembly of FIG. 9 in its latched position with respect to a shoulder of a vehicle.

In certain embodiments, the window assembly as described above can comprise multiple latch bolts. Each latch bolt in such an embodiment typically will essentially be a mirror image of the other and will be mounted in the same fashion described above. The multiple latches can be actuated by either a single or multiple release handles, and can be urged towards a first position by either a single biasing member or multiple biasing members. One such embodiment is seen in FIG. 12, where two latch bolts 78 are shown. It is to be appreciated that three or more latch bolts are considered to be within the scope of the present invention. In addition to the structure described above with respect to the single latch bolt, this embodiment includes a connecting cable 162 attached at a first end 164 to back surface 94 of a first latch bolt 78, and attached at a second end 166 to front surface 92 of a second latch bolt 78. Latch housing 82' may optionally comprise an intermediate span 168 extending downward from top surface 88 of cavity 84 and containing a channel 170 through which connecting cable 162 travels. A tie bar could optionally be used in place of connecting cable 162 to operatively connect latch bolts 78. Other suitable configurations for multiple latch bolt egress latches include those where at least one of the latch bolts is located on a different peripheral edge of the window assembly than at least one other latch bolt. Other suitable multiple latch bolt configurations will be readily apparent to those of skill in the art, given this disclosure.

Figure 14:
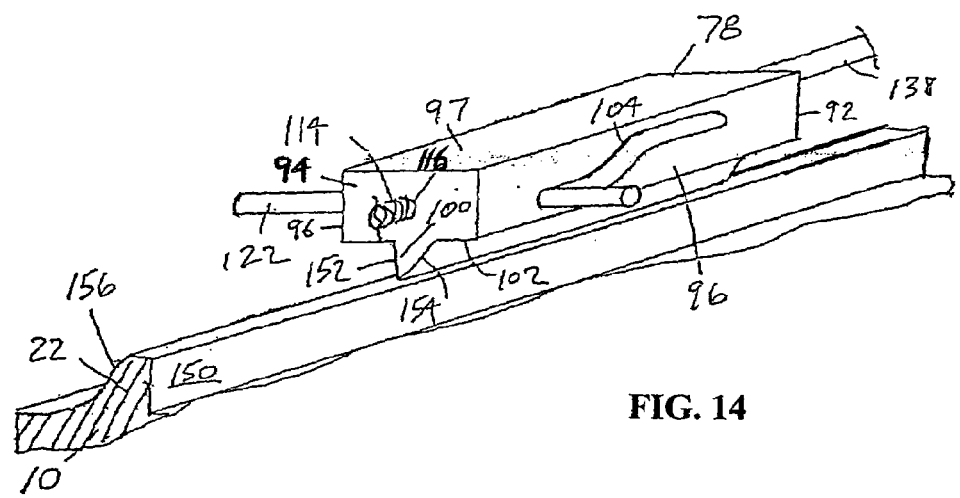
FIG. 14 is a perspective view showing the latch bolt of the egress latch assembly of FIG. 9 in its unlatched position with respect to a shoulder of a vehicle as the window is being opened.
Figure 15:
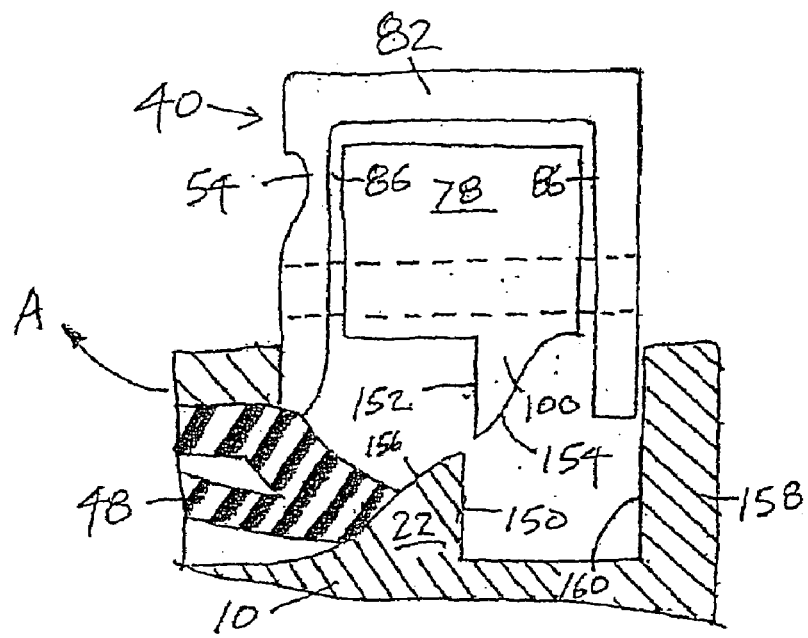
FIG. 15 is a section view, partially broken away, of the egress latch assembly of FIG. 9, shown in the unlatched position.

The mode of operation of certain egress-type embodiments will now be described. As can be seen in FIGS. 9, 10, 12 and 13, when the window is closed, latch bolt 78 is in the first or latched position, held there by the biasing of the spring 114. Engaging face 152 of latch bolt 78 is engaged with engaging face 150 of shoulder 22, and serves to prevent the window from being opened. To open the window, release handle 130 is turned or pivoted downward, and cam 136 serves to draw the first end of actuating cable 138 along with it as handle 130 is rotated. This motion of the first end of actuating cable 138 is translated via directional channel 144 to a horizontal movement of latch bolt 78 in a direction opposite the bias of spring 114. Upon experiencing this biasing force, latch bolt 78 moves in a horizontal direction with mounting pins 122 moving along first segment 106 until they encounter third segments 110. Latch bolt 78 then moves in an angular direction upward until mounting pins 122 encounter second segments 108. Latch bolt then moves horizontally as mounting pins move within second segments 108 to the second position, where mounting pins 122 encounter the ends of compound mounting pin slots 104. Accordingly, the movement of latch bolt 78 is a compound sliding movement, that is, an angular, serpentine or curvilinear movement, corresponding to mounting pins 122 moving along the compound mounting pin slots 104, and is not a monolinear or straight movement. This motion of latch bolt 78 draws beveled latch portion 100 away from spring 114 and upward with respect to jamb 10, such that beveled latch portion 100 and shoulder 22 are disengaged upon the completion of movement of latch bolt 78, as seen in FIGS. 14 and 15. This removes all obstacles to swinging pane 7 outwardly in the direction of arrow A, seen in FIG. 15, to open the window, permitting egress.

Figure 16:
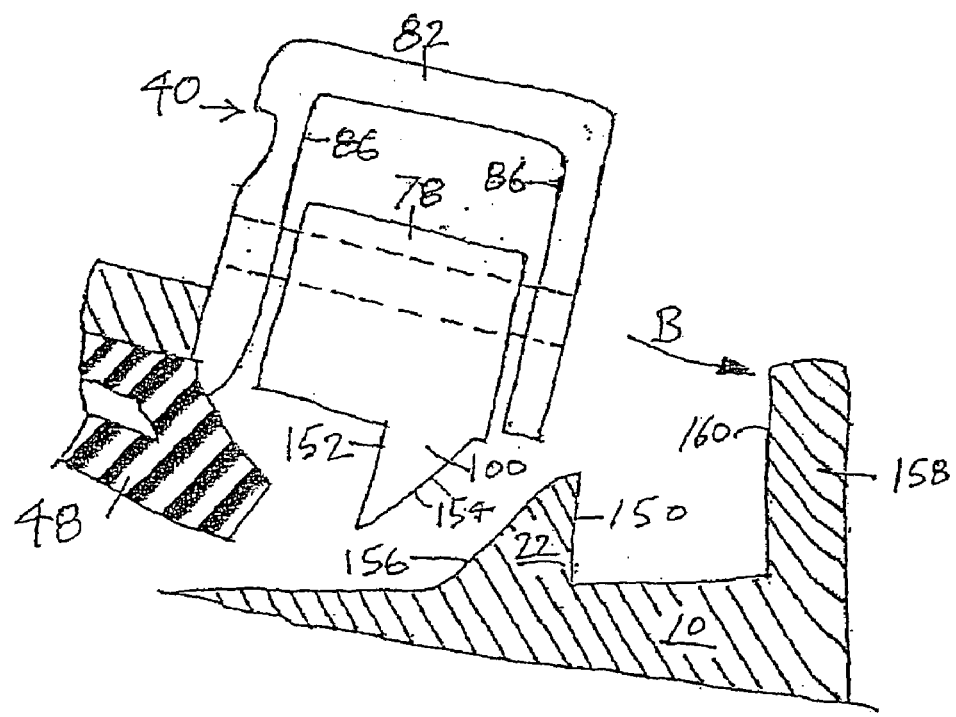
FIG. 16 is a section view, partially broken away, of the egress latch assembly of FIG. 9, shown in the unlatched, open position.

Upon the window being opened and release handle 130 being released to its original position, spring 114 biases latch bolt 78 back to the first position, as can be seen in FIG. 16. At this point, the window can be closed and latched from the exterior of the vehicle merely by slamming the window shut in the direction of arrow B. When second face 154 of beveled latch portion 100 encounters second face 156 of shoulder 22, the angle of the faces combines with the closing force being exerted to force latch bolt 78 upwardly in the direction dictated by compound mounting pin slots 104 against the bias of spring 114 until the lower edge of beveled latch portion 100 clears the upper edge of shoulder 22. As beveled latch portion 100 clears shoulder 22, latch bolt housing 82 engages lip 158, retaining latch bolt 78 in an inboard-outboard direction. When the window is thus in the fully closed position, spring 114 biases latch bolt 78 back into the first position, moving beveled latch portion 100 down such that it reengages shoulder 22 and latches the window shut.

From the foregoing disclosure, it will be readily apparent to those skilled in the art, that is, to those who are knowledgeable or experienced in this area of technology, that the present invention provides a significant technological advance in appearance and streamlining of transom window assemblies. Those who are skilled in this area of technology will recognize that various modifications and additions can be made to the preferred embodiments discussed above without departing from the true scope and spirit of the invention. Those skilled in the art will recognize from this disclosure the suitability of other designs and configurations that also provide for a window assembly with a low-cost sacrificial glazing design. All such alternative embodiments are intended to be covered by the following claims.

It should be understood that the preferred embodiments disclosed herein are by way of example only and merely illustrative of but a small number of the many possible specific embodiments that can represent applications of the principles of the present invention. In light of the foregoing disclosure of the invention and description of the preferred embodiments, those skilled in this area of technology will readily understand that various modifications and adaptations can % be made without departing from the scope and spirit of the invention. All such modifications and adaptations are intended to be covered by the following claims.

We claim:

1. A vehicle window assembly comprising, in combination:
    a windowpane having an interior surface, an exterior surface and a transom opening edge;
    a window frame adhered to the interior surface of the windowpane and not extending outwardly beyond the plane defined by the exterior surface of the windowpane;
    an openable transom pane having an interior surface, an exterior surface and a lower edge, the windowpane and the transom pane being adjacent to each other at the transom opening edge and lower edge, respectively; and
    a transom hinge hingedly connecting the windowpane and the transom pane to each other at the transom opening edge and lower edge, respectively, comprising a first hinge portion attached directly to the interior surface of the transom pane along the lower edge and a second hinge portion attached to the interior surface of the windowpane along the transom opening edge.

2. The window assembly of claim 1 wherein the first hinge portion is attached to the transom pane by adhesive.

3. The window assembly of claim 1 wherein the second hinge portion is attached to the windowpane by adhesive.

4. The window assembly of claim 1, wherein the first hinge portion is attached by fasteners to the transom pane.

5. The window assembly of claim 4, wherein the fasteners do not extend through the exterior surface of the transom pane.

6. The window assembly of claim 1, wherein the interior surface of the transom pane is coated under the first hinge portion.

7. The window assembly of claim 1, wherein the interior surface of the transom pane is coated with frit under the first hinge portion.

8. The vehicle window assembly of claim 1, wherein the exterior surface of the transom pane is uncovered and uninterrupted.

9. The vehicle window assembly of claim 1, wherein the exterior surface of the windowpane is uncovered and uninterrupted.

10. The vehicle window assembly of claim 1, wherein the windowpane and the transom pane are substantially flush to each other.

11. The vehicle window assembly of claim 1, wherein the transom window is located entirely above the windowpane.

12. The vehicle window assembly of claim 1, further comprising a transom latch operative to latch the transom window in a closed position, the transom latch comprising a first transom latch portion attached to the interior surface of the transom pane.

13. The vehicle window assembly of claim 12, wherein the transom latch assembly is self-latching.

14. The vehicle window assembly of claim 12, wherein no part of the first transom latch portion extends outwardly beyond the plane defined by the exterior surface of the transom pane.

15. The vehicle window assembly of claim 14, wherein the first transom latch portion is attached to the interior surface of the transom pane by adhesive.

16. The vehicle window assembly of claim 1, wherein the windowpane has at least one additional edge adjacent to a second edge of the transom pane.

17. The vehicle window assembly of claim 1, further comprising a panel having at least one edge adjacent to a second edge of the transom pane.

18. The vehicle window assembly of claim 1, further comprising at least one transom window stop operative to prevent the transom pane from opening more than a predetermined amount and having a first end attached to the interior surface of the transom pane.

19. The vehicle window assembly of claim 18, wherein the transom window stop comprises a spring plunger.

20. The vehicle window assembly of claim 1, further comprising a transom window frame adhered to the interior surface of the transom pane and not extending outwardly beyond the plane defined by the exterior surface of the transom pane.

21. The vehicle window assembly of claim 20, wherein the first hinge portion is unitary with at least a portion of the transom window frame.

22. The vehicle window assembly of claim 1, further comprising a backframe adapted to fit into an opening in a vehicle wall, wherein the window frame is attached to the backframe.

23. The vehicle window assembly of claim 22, wherein the window frame comprises a first egress hinge portion and the backframe comprises a second egress hinge portion, the first egress hinge portion being hingedly attached to the second egress hinge portion.

24. The vehicle window assembly of claim 23 wherein the window frame further comprises a first egress latch portion and the backframe comprises a second egress latch portion, the first egress latch portion being operable to releasably engage the second egress latch portion.

25. The vehicle window assembly of claim 24, wherein the egress latch assembly is self-latching.

26. A vehicle window assembly comprising, in combination:
 a windowpane having an interior surface, an exterior surface and a transom opening edge;
 a window frame adhered to the interior surface of the windowpane and not extending outwardly beyond the plane defined by the exterior surface of the windowpane;
 an openable transom pane having an interior surface, an exterior surface and a lower edge, the windowpane and the transom pane being adjacent to each other at the transom opening edge and lower edge, respectively; and
 a transom hinge hingedly connecting the windowpane and the transom pane to each other at the transom opening edge and lower edge, respectively, comprising a first hinge portion attached to the transom pane and a second hinge portion attached to the windowpane, the exterior surface of the transom pane being uncovered and uninterrupted.

27. The vehicle window assembly of claim 26 wherein no part of the first hinge portion extends outwardly beyond the exterior surface of the transom pane and no part of the second hinge portion extends outwardly beyond the exterior surface of the windowpane.

28. The vehicle window assembly of claim 27 further comprising a transom window frame attached to the interior surface of the transom pane, wherein no part of the transom window frame extends outwardly beyond the exterior surface of the transom pane.

29. The vehicle window assembly of claim 26 wherein the transom pane and the windowpane are substantially flush to one another.

30. The vehicle window assembly of claim 29 wherein the transom pane and the windowpane lie in the same flat plane.

31. The vehicle window assembly of claim 29 wherein the transom pane and the windowpane are substantially flush and curvo-planar.

32. The vehicle window assembly of claim 26 wherein the second hinge portion is attached directly to the interior surface of the windowpane along the transom opening edge.

33. The vehicle window assembly of claim 26, further comprising an extension strip located between the windowpane and the transom pane.

34. The vehicle window assembly of claim 33 wherein the second hinge portion is attached to the extension strip and no portion of the extension strip extends outwardly beyond the plane defined by the exterior surface of the window pane.

35. A vehicle window assembly comprising, in combination:
 a windowpane having an interior surface and an exterior surface and a transom opening edge;
 a window frame adhered to the interior surface of the windowpane and not extending outwardly beyond the plane defined by the exterior surface of the windowpane;
 an openable transom pane having an interior surface, an exterior surface and a lower edge, the windowpane and the transom pane being adjacent to each other at the transom opening edge and lower edge, respectively; and
 means for hingedly attaching the transom pane to the windowpane at the lower edge and transom opening edge, respectively;
 transom window stop means operative to prevent the transom pane from opening more than a predetermined amount; and
 means for latching the transom pane in a closed position;
 wherein no part of the means for hingedly attaching the transom pane to the windowpane and the means for latching the transom pane in a closed position extends beyond the plane defined by the exterior surface of the transom pane.

36. A vehicle having at least one vehicle window assembly mounted therein, the vehicle window assembly comprising, in combination:
 a windowpane having an interior surface, an exterior surface and a transom opening edge;
 an openable transom pane having an interior surface, an exterior surface and a lower edge, the windowpane and the transom pane being adjacent to each other at the transom opening edge and lower edge, respectively;
 a transom hinge hingedly connecting the windowpane and the transom pane to each other at the transom opening edge and lower edge, respectively, comprising a first hinge portion attached directly to the interior surface of the transom pane along the lower edge and a second hinge portion attached to the interior surface of the windowpane along the transom opening edge; and at least a second window assembly comprising a second windowpane wherein the windowpane and transom pane each is substantially flush to the second windowpane.

37. The vehicle of claim 36, wherein the windowpane and transom pane each is substantially flush to an adjacent exterior surface of the vehicle.

\* \* \* \* \*